US012077002B2

(12) United States Patent
Mizutani et al.

(10) Patent No.: US 12,077,002 B2
(45) Date of Patent: Sep. 3, 2024

(54) PRINTING APPARATUS AND NON-TRANSITORY COMPUTER-READABLE STORAGE MEDIUM

(71) Applicant: BROTHER KOGYO KABUSHIKI KAISHA, Nagoya (JP)

(72) Inventors: Toshiaki Mizutani, Kasugai (JP); Kodai Mizuno, Hekinan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 121 days.

(21) Appl. No.: 17/703,222

(22) Filed: Mar. 24, 2022

(65) Prior Publication Data

US 2022/0212477 A1 Jul. 7, 2022

Related U.S. Application Data

(63) Continuation-in-part of application No. PCT/JP2020/034862, filed on Sep. 15, 2020.

(30) Foreign Application Priority Data

Sep. 30, 2019 (JP) ................................ 2019-180162

(51) Int. Cl.
*B41J 2/18* (2006.01)
*B41J 2/045* (2006.01)

(52) U.S. Cl.
CPC ....................................... *B41J 2/18* (2013.01)

(58) Field of Classification Search
CPC ....... B41J 2/18; B41J 2/04501; B41J 2/16517
See application file for complete search history.

(56) References Cited

U.S. PATENT DOCUMENTS

| | | | |
|---|---|---|---|
| 2008/0239027 A1 | 10/2008 | Kinase et al. |
| 2012/0050357 A1 | 3/2012 | Rasmussen et al. |
| 2013/0021396 A1 | 1/2013 | Hirano |
| 2014/0098146 A1 | 4/2014 | Kamiyama et al. |

(Continued)

FOREIGN PATENT DOCUMENTS

| | | |
|---|---|---|
| JP | 2003001838 A | 1/2003 |
| JP | 2008264767 A | 11/2008 |
| JP | 2011116102 A | 6/2011 |

(Continued)

OTHER PUBLICATIONS

International Search Report for Application No. PCT/JP2020/034862, dated Nov. 10, 2020 (2 pages).

(Continued)

*Primary Examiner* — Jason S Uhlenhake
(74) *Attorney, Agent, or Firm* — K&L Gates LLP

(57) ABSTRACT

A printing apparatus performs a circulation of ink and a cleaning operation for an inkjet head. In a case where it is determined that a circulation timing for performing the circulation of the ink comes to be arrived, a controller of the printing apparatus determines whether or not to arrive at a print timing. In a case where it is determined that the print timing comes to be arrived, the controller performs the circulation and the cleaning operation. On the other hand, in a case where it is not determined that the print timing comes to be arrived, the controller performs the circulation and does not perform the cleaning operation.

10 Claims, 6 Drawing Sheets

(56) References Cited

U.S. PATENT DOCUMENTS

| | | | |
|---|---|---|---|
| 2018/0281434 | A1 | 10/2018 | Shimizu |
| 2019/0009590 | A1 | 1/2019 | Fukasawa et al. |

FOREIGN PATENT DOCUMENTS

| | | | | | |
|---|---|---|---|---|---|
| JP | 2011121344 | A | * | 6/2011 | .......... B41J 2/17509 |
| JP | 2011201155 | A | * | 10/2011 | |
| JP | 2014076577 | A | | 5/2014 | |
| JP | 2014111334 | A | | 6/2014 | |
| JP | 2016186657 | A | * | 10/2016 | |
| JP | 2017164976 | A | | 9/2017 | |
| JP | 2018165012 | A | | 10/2018 | |
| JP | 2018167497 | A | | 11/2018 | |
| JP | 2019014146 | A | | 1/2019 | |

OTHER PUBLICATIONS

Office Action issued in corresponding Japanese Patent Application No. 2019-180162, dated Jan. 24, 2023. (2 pages.).

Office Action issued in related Japanese Patent Application No. 2019-180162, dated Nov. 1, 2022. (2 pages.).

International Preliminary Report on Patentability for corresponding PCT application PCT/JP2020/034862, dated Apr. 5, 2022.

Written Opinion for corresponding PCT application PCT/JP2020/034862, dated Nov. 10, 2020.

* cited by examiner

PRINTING APPARATUS AND NON-TRANSITORY COMPUTER-READABLE STORAGE MEDIUM

CROSS-REFERENCE TO RELATED APPLICATION

This is a continuation application of International Application No. PCT/JP2020/034862 filed on Sep. 15, 2020 which claims the benefit of priority from Japanese patent application No. 2019-180162 filed on Sep. 30, 2019. The entire contents of the earlier applications are incorporated herein by reference.

BACKGROUND

An inkjet printing apparatus configured to perform a circulation of sedimentary ink at predetermined time intervals is suggested. When the ink is circulated, an ink concentration is uniformly restored. However, during the circulation of ink, a meniscus of the ink nozzle of an inkjet head is affected by a pressure variation and the like, and there is a concern that normal ink ejection cannot be performed. For this reason, a cleaning operation for the inkjet head is performed after the circulation.

In the above printing apparatus, when the circulation operation of ink that is performed at predetermined time intervals is stopped, a purging of discharging the ink in the inkjet head from the ink nozzle is performed, and then, a nozzle surface of the inkjet head is cleaned. Since the cleaning operation such as purging is always performed after the circulation operation of ink, there is a problem that ink consumption resulting from the cleaning operation increases.

SUMMARY

An object of the present disclosure is to provide a printing apparatus and a non-transitory computer-readable storage medium storing a computer program, which enable to reduce ink consumption resulting from a cleaning operation in the printing apparatus performing a circulation of ink and the cleaning operation for an inkjet head.

A first aspect of the present disclosure is a printing apparatus including a reservoir, an inkjet head and a controller. The reservoir is configured to store ink. The inkjet head is connected to the reservoir via a flow path. The controller is configured to perform circulation timing determination processing, print timing determination processing and circulation processing. In the circulation timing determination processing, the controller determines whether or not to arrive at a circulation timing for performing a circulation of the ink via at least one of the flow path or the inkjet head. In the print timing determination processing, the controller determines whether or not to arrive at a print timing, in a case where it is determined that the circulation timing comes to be arrived. In the circulation processing, the controller causes the printing apparatus to perform the circulation and a subsequent cleaning operation for the inkjet head in a case where it is determined that the print timing comes to be arrived, and to perform the circulation and not perform the subsequent cleaning operation in a case where it is not determined that the print timing comes to be arrived.

In the printing apparatus, in the case where the controller does not determine that the print timing comes to be arrived, the controller performs the circulation and does not perform the subsequent cleaning operation. Therefore, the ink consumption resulting from the cleaning operation is reduced.

A second aspect of the present disclosure is a non-transitory computer-readable storage medium storing a computer program. The computer program is executed by a processor of a printing apparatus including a reservoir, an inkjet head and a processor. The reservoir is configured to store ink. The inkjet head is connected to the reservoir via a flow path. The computer program causes the processor to perform circulation timing determination processing, print timing determination processing and circulation processing. In the circulation timing determination processing, the processor determines whether or not to arrive at a circulation timing for performing a circulation of the ink via at least one of the flow path or the inkjet head. In the print timing determination processing, the processor determines whether or not to arrive at a print timing, in a case where it is determined that the circulation timing comes to be arrived. In the circulation processing, the processor causes the printing apparatus to perform the circulation and a subsequent cleaning operation for the inkjet head in a case where it is determined that the print timing comes to be arrived, and to perform the circulation and not to perform the subsequent cleaning operation in a case where it is not determined that the print timing comes to be arrived.

In the case where the processor does not determine that the print timing comes to be arrived, the processor performs the circulation and does not perform the subsequent cleaning operation. Therefore, the ink consumption resulting from the cleaning operation is reduced.

DETAILED DESCRIPTION

A schematic configuration of a printing apparatus 1 will be described with reference to FIGS. 1 to 3. The upper, lower, left lower, right upper, right lower and left upper in FIG. 1 are the upper, lower, front, rear, right and left of the printing apparatus 1, respectively.

Figure 1:
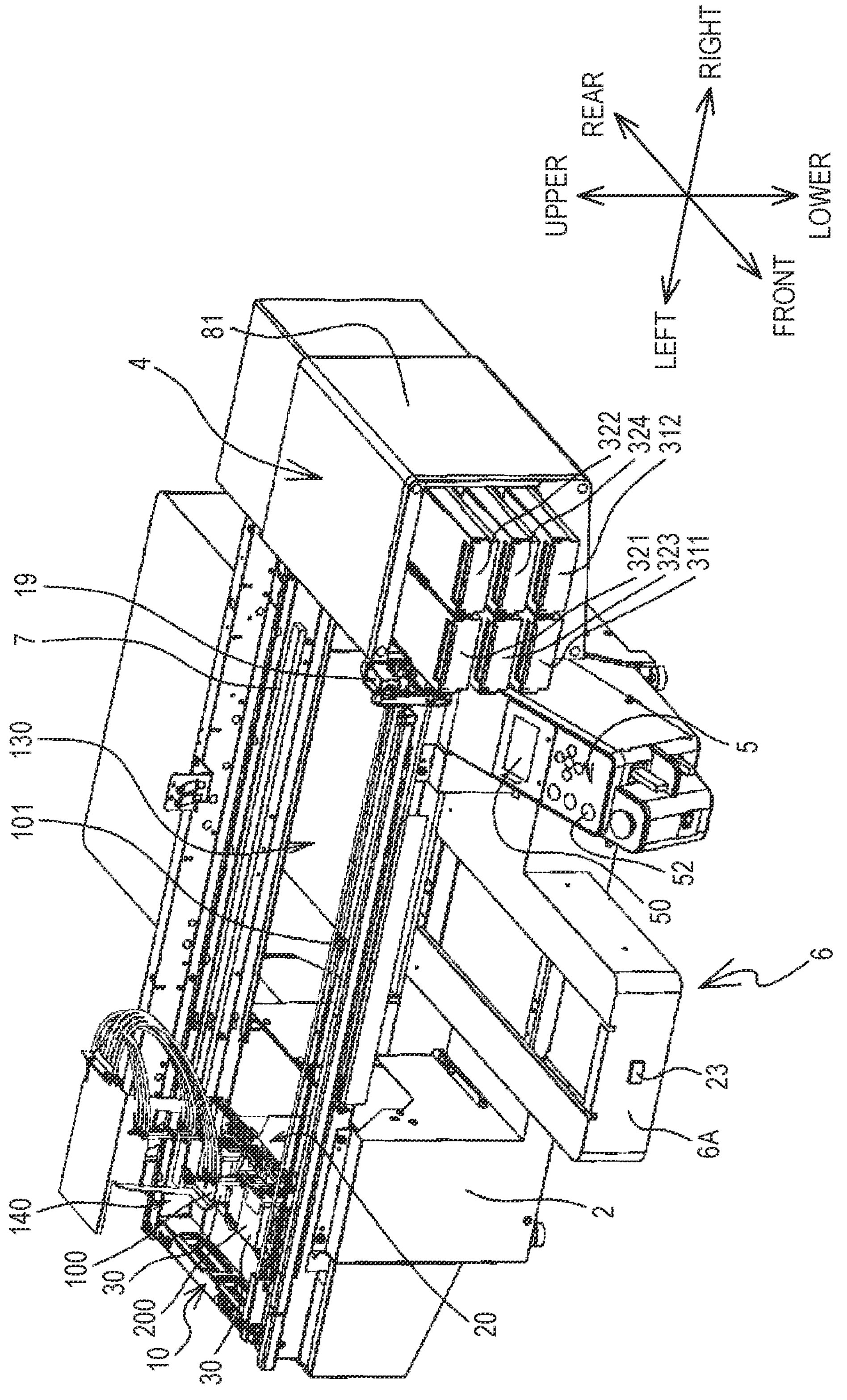
FIG. 1 is a perspective view of a printing apparatus 1.

As shown in FIG. 1, the printing apparatus 1 is an inkjet printer configured to perform printing by ejecting liquid ink onto a printing medium (not shown) such as paper and fabric such as a T-shirt. The printing apparatus 1 is configured to print a color image on the printing medium by ejecting, for example, five types of inks (white (W), black (K), yellow (Y), cyan (C), and magenta (M)) having different colors downward. In descriptions below, white ink of the five types of inks is referred to as white ink, and inks of four colors of black, cyan, yellow and magenta are collectively referred to as color ink. Further, when collectively referring to white ink and color ink or when any one is not specified, they are simply referred to as ink.

The white ink is mainly ejected to an entire or partial printing area, as a base in printing, when a color of the printing medium is a deep color. The color ink is mainly used for printing after the white ink is ejected. The white ink is a liquid containing a component having a higher sedimentation property than a component contained in the color ink. The component having a high sedimentation property is, for example, titanium oxide. Titanium oxide is an inorganic pigment with a relatively high specific gravity. Pigment particles tend to settle in the white ink containing a component having a high sedimentation property For this reason, when performing printing by the white ink, it is necessary to maintain favorable flowability in a flow path of the white ink of the white ink by keeping the white ink in a sufficiently agitated state.

Figure 2:
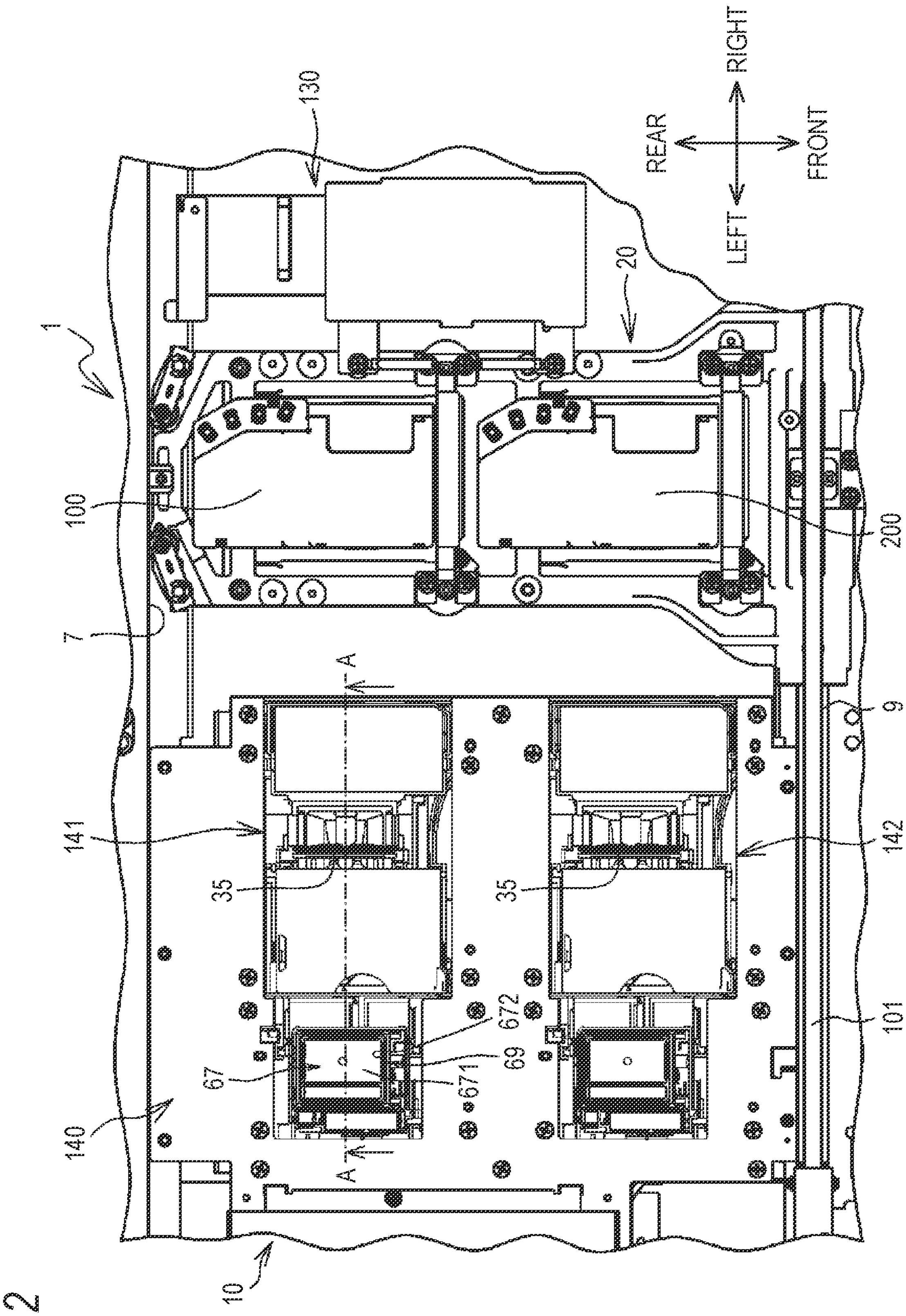
FIG. 2 is a plan view of an inside of the printing apparatus 1.

As shown in FIGS. 1 and 2, the printing apparatus 1 includes a housing 2, a frame body 10, a guide shaft 9, a rail 7, a carriage 20, head units 100 and 200, a drive belt 101, a drive motor 19, a platen drive mechanism 6, a mounting frame unit 4, and maintenance units 141 and 142 in a non-printing area 140, which will be described later.

An operation panel 5 for operating the printing apparatus 1 is provided at a position on the right front side of the housing 2. The operation panel 5 includes a display 50 and an operation button 52. The operation button 52 is operated when an operator inputs instructions regarding various operations of the printing apparatus 1.

The frame body 10 has a substantially rectangular frame shape, as seen from above, and is installed on an upper part of the housing 2. The frame body 10 is configured to support the guide shaft 9 (refer to FIG. 2) on the front side and the rail 7 on the rear side, respectively. The guide shaft 9 extends in a right and left direction inside the frame body 10. The rail 7 is arranged to face the guide shaft 9 and extends in the right and left direction.

The carriage 20 is supported so as to be able to be conveyed in the right and left direction along the guide shaft 9. As shown in FIGS. 1 and 2, the head units 100 and 200 are arranged in a front and rear direction and mounted on the carriage 20. The head unit 100 is located behind the head unit 200. As shown in FIGS. 1 to 3, the head units 100 and 200 have a housing 30, respectively. As shown in FIG. 3, the housing 30 of the head unit 100 is configured to support a head part 110 capable of ejecting ink toward a printing medium at a lower part. A lower part of the head unit 200 is also configured in a similar manner to the head unit 100.

The head part 110 includes a nozzle surface (not shown) that is a surface having a plurality of fine nozzles (not shown) capable of ejecting ink downward. The nozzle surface is a flat surface extending in the right and left and front and rear directions, and forms a bottom surface of each of the head units 100 and 200.

As shown in FIG. 1, the drive belt 101 is bridged along the right and left direction inside the frame body 10. The drive motor 19 is connected to the carriage 20 via a drive belt 101. When the drive motor 19 drives the drive belt 101, the carriage 20 is reciprocally moved in the right and left direction along the guide shaft 9.

The platen drive mechanism 6 includes a pair of guide rails (not shown) and a platen (not shown). The pair of guide rails extends in the front and rear direction inside the platen drive mechanism 6 and is configured to support the platen so as to be movable in the front and rear direction along the pair of guide rails. The platen has a substantially rectangular plate shape where a longitudinal direction is the front and rear direction, as seen from above, and is provided below the frame body 10. The platen is configured to hold the printing medium at an upper part. The platen drive mechanism 6 is configured to convey the printing medium in the front and rear direction (sub-scanning direction) by moving the platen in the front and rear direction by using a motor (not shown) provided at a rear end portion of the printing apparatus 1 as a drive source. Printing is performed on the printing medium by ejecting ink from the head part 110 that reciprocally moves in the right and left direction (main scanning direction). A human detecting sensor 23 configured to detect a human is provided at a front end portion of the platen drive mechanism 6.

As shown in FIG. 1, the mounting frame unit 4 is provided on a right side of the housing 2. The mounting frame unit 4 is supported by a substantially cuboid housing 81 where a longitudinal direction is the front and rear direction. Cartridges 311 and 312 configured to accommodate the white ink and cartridges 321 to 324 configured to accommodate the color ink can be mounted to the mounting frame unit 4.

As shown in FIGS. 1 and 2, an area where printing by the head units 100 and 200 is performed on movement paths of the head units 100 and 200 is referred to as a printing area 130. An area other than the printing area 130 on the movement paths of the head units 100 and 200 is referred to as a non-printing area 140. The non-printing area 140 is an area at a left end portion of the printing apparatus 1. The printing area 130 is an area ranging from a right side of the non-printing area 140 to a right end portion of the printing apparatus 1. The platen is provided below the movement paths of the head units 100 and 200, in the printing area 130.

As shown in FIG. 2, the maintenance units 141 and 142 are provided below the movement paths of the head units 100 and 200, respectively, in the non-printing area 140. In the maintenance units 141 and 142, a head cleaning such as purging is performed so as to restore ink ejection performance of the head units 100 and 200 and to ensure a printing quality of the printing apparatus 1. The purging is an operation where the head units 100 and 200 discharge inks containing foreign matters, air bubbles or the like from the head part 110 and the like.

As shown in FIG. 2, the maintenance unit 141 includes a cap 67 and the like. The cap 67 is provided on a left side of the maintenance unit 141, is made of a synthetic resin such as silicon rubber, and has a bottom wall 671 and a peripheral wall 672. The cap 67 is arranged inside a cap support part 69 configured to support the cap 67. The cap support part 69 is configured to move in an upper and lower direction by drive of a motor, a gear and the like (not shown). A cap lip 676 of the peripheral wall 672 of the cap 67 having moved upward is in close contact with the periphery of a nozzle arrangement area of a first nozzle row W1 (refer to FIG. 3), a second nozzle row W2 (refer to FIG. 3), a third nozzle row (not shown) and a fourth nozzle row (not shown) in the head unit 100 having moved to the non-printing area 140. Thereby, the first nozzle row W1 to the fourth nozzle row are covered. In descriptions below, positions of the cap 67 and the cap support part 69 at the time when the cap 67 is in close contact with the periphery of the nozzle arrangement area are referred to as a covering position. In addition, positions of the cap 67 and the cap support part 69 at the time when the cap 67 is not in close contact with the periphery of the nozzle arrangement area are referred to as a cap separation position. The cap 67 is connected to a suction pump 199 (refer to FIG. 4) by a tube (not shown). When the suction pump 199 is driven, an inside of the cap 67 surrounded by the bottom wall 671 and the peripheral wall 672 becomes a negative pressure. When the cap 67 and the cap support part 69 are at the covering position, the suction pump 199 makes the inside of the cap 67 a negative pressure, so that the purging is performed. Further, the maintenance units 141 and 142 are provided with wiper blades 35 and 35. The wiper blade 35 is used for a wipe, which will be described later.

Ink Supply Unit 700

In the below, an ink supply unit 700 configured to supply the white ink to the head unit 100 is described with reference to FIG. 3. The ink supply unit 700 is configured to supply the white ink to the head part 110, and is a part where the white ink circulates. The ink supply unit 700 includes a first supply flow path 711, a second supply flow path 712, a third supply flow path 713, a fourth supply flow path 714, a fifth supply flow path 715, a first circulation flow path 721, and a first bypass flow path 801, a second bypass flow path 802A, a second bypass flow path 802B, a sub-pouch 8, a pump 752, opening/closing valves 31, 763 and 766, and filters 771, 772 and 773. In the below, the entire second bypass flow path 802A and second bypass flow path 802B are 'second bypass flow path 802'.

The head part 110 includes a first nozzle row W1 and a second nozzle row W2 for ejecting white ink, and a flow path 670. The flow path 670 has one end connected to the fourth supply flow path 714, and the other end connected to the fifth supply flow path 715. In addition, the flow path 670 is configured to connect the first nozzle row W1 and the second nozzle row W2. The head unit 100 includes another head part having a third nozzle row and a fourth nozzle row (not shown) having a similar configuration to that described above. A flow path for supplying white ink to the third nozzle row and the fourth nozzle row has a similar configuration to the flow path for supplying white ink to the first nozzle row W1 and the second nozzle row W2. Therefore, in descriptions below, the head part 110 including the first nozzle row W1 and the second nozzle row W2 is described, and the descriptions of the head part including the third nozzle row and the fourth nozzle row are omitted.

As an example, the sub-pouch 8 has a flexible bag shape and is configured to accommodate the white ink supplied from the white ink cartridges 311 and 312. In addition, the sub-pouch 8 is configured to supply the white ink to the head part 110. The head part 110 is configured to eject the white ink supplied from the sub-pouch 8 to perform printing on a printing target.

The first bypass flow path 801, the second bypass flow path 802, the first supply flow path 711, the second supply flow path 712, the third supply flow path 713, the fourth supply flow path 714, the fifth supply flow path 715, and the first circulation flow path 721 are formed by, for example, hollow tubes. The first supply flow path 711 is a flow path connected to the white ink cartridges 311 and 312 (refer to FIG. 1) and the sub-pouch 8 and configured to supply the white ink from the white ink cartridges 311 and 312 to the sub-pouch 8 via a degassing module (not shown).

The second supply flow path 712 is connected to the sub-pouch 8, the fourth supply flow path 714 and the fifth supply flow path 715. The second supply flow path 712 is a flow path configured to supply the white ink from the sub-pouch 8 to the head part 110 via the fourth supply flow path 714 and the fifth supply flow path 715. The third supply flow path 713 is a flow path connected to the sub-pouch 8 and configured to supply the white ink from the sub-pouch 8 to the head part including the third nozzle row and the fourth nozzle row (not shown). The fourth supply flow path 714 is a flow path connected to the second supply flow path 712 and the first nozzle row W1 of the head part 110 and configured to supply the white ink to the first nozzle row W1. The fifth supply flow path 715 is a flow path connected to the second supply flow path 712 and the second nozzle row W2 of the head part 110 and configured to supply the white ink to the second nozzle row W2.

The first circulation flow path 721 is a flow path connected to the first supply flow path 711 or the white ink cartridges 311 and 312 and the sub-pouch 8 and configured to circulate the white ink from the sub-pouch 8 to the first supply flow path 711 or the white ink cartridges 311 and 312. The fourth supply flow path 714 has the opening/closing valve 763 and the filter 771. The opening/closing valve 763 is controlled by the CPU 11 to open/close the fourth supply flow path 714. The filter 773 is configured to remove foreign matters contained in the white ink flowing through the fourth supply flow path 714. The fifth supply flow path 715 has the opening/closing valve 766 and the filter 773. The opening/closing valve 766 is controlled by the CPU 11 to open/close the fifth supply flow path 715. The filter 773 is configured to remove foreign matters contained in the white ink flowing through the fifth supply flow path 715.

Figure 3:
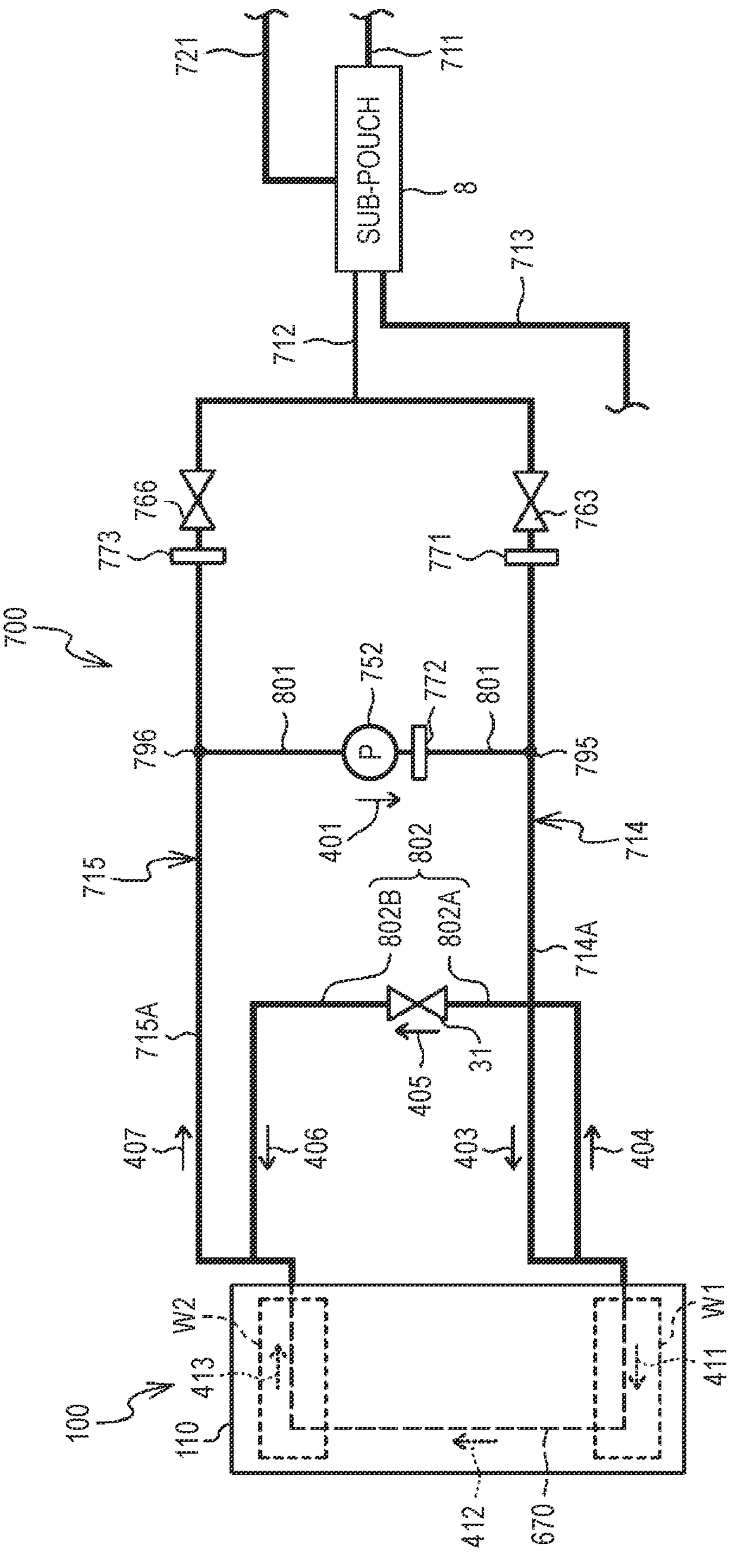
FIG. 3 shows an ink supply unit 700 of white ink of the printing apparatus 1.

In the ink supply unit 700 shown in FIG. 3, the first bypass flow path 801 is configured to connect the fourth supply flow path 714 and the fifth supply flow path 715. The fourth supply flow path 714 has a first connection portion 795 between the filter 771 and the first nozzle row W1. The first connection portion 795 is configured to connect the fourth supply flow path 714 and the first bypass flow path 801. In addition, the fifth supply flow path 715 has a second connection portion 796 between the filter 773 and the second nozzle row W2. The second connection portion 796 is configured to connect the fifth supply flow path 715 and the first bypass flow path 801. Further, the first bypass flow path 801 includes the filter 772 and the pump 752 from the first connection portion 795 toward the second connection portion 796. The filter 772 is configured to remove foreign matters contained in the white ink flowing through the first bypass flow path 801. Note that, a flow path of the fourth supply flow path 714 between the first connection portion 795 and the head part 110 is referred to as a fourth supply flow path 714A. In addition, a flow path of the fifth supply flow path 715 between the second connection portion 796 and the head part 110 is referred to as a fifth supply flow path 715A. The fifth supply flow path 715A is configured to function as a reflux flow path for the white ink during circulation processing of the white ink, which will be described later.

In the printing apparatus 1 shown in FIG. 3, on the head part 110-side, the fourth supply flow path 714A and the fifth supply flow path 715A are connected via the second bypass flow path 802. The second bypass flow path 802 includes an opening/closing valve 31. A flow path of the second bypass flow path 802 between the opening/closing valve 31 and the fourth supply flow path 714A is the second bypass flow path 802A. A flow path between the opening/closing valve 31 and the fifth supply flow path 715A is the second bypass flow path 802B. Note that, the description of an ink supply unit configured to supply the color ink to the head unit 200 is omitted. The ink supply unit configured to supply the color ink to the head unit 200 may have a similar structure to the ink supply unit 700, or may not have the first bypass flow path 801 and the second bypass flow path 802 and may not have a structure where the color ink circulates.

Electrical Configuration of Printing Apparatus 1

Figure 4:
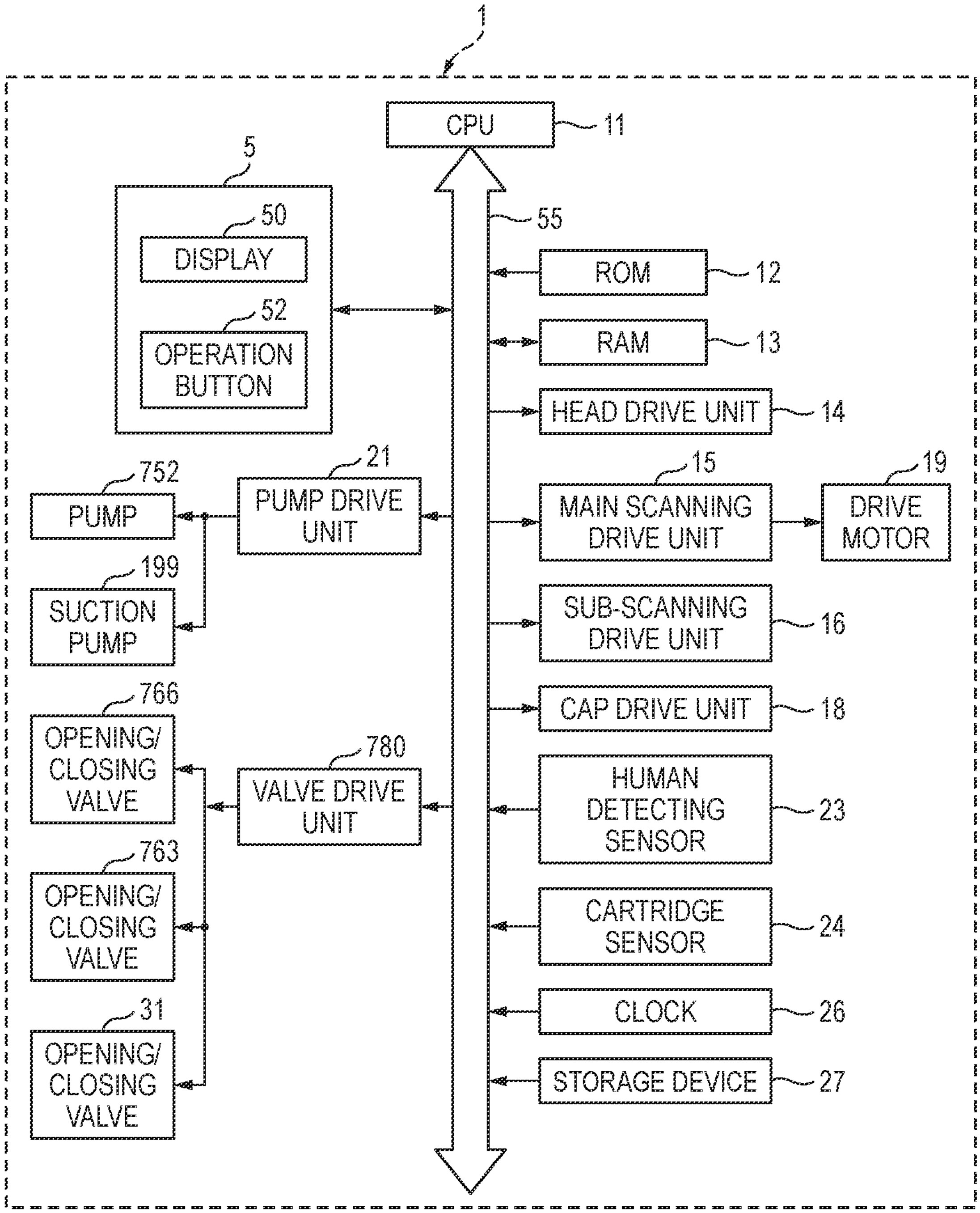
FIG. 4 is a block diagram showing an electrical configuration of the printing apparatus 1.

As shown in FIG. 4, the printing apparatus 1 includes the CPU 11 responsible for control of the printing apparatus 1.

The CPU 11 electrically connects a ROM 12, a RAM 13, a head drive unit 14, a main scanning drive unit 15, a sub-scanning drive unit 16, a cap drive unit 18, an operation panel 5, a pump drive unit 900, a valve drive unit 780, a human detecting sensor 23, a cartridge sensor, a clock 26 and a storage device 27 via a bus 55.

The ROM 12 is configured to store a control program, initial values, and the like for the CPU 11 to control an operation of the printing apparatus 1. The RAM 13 is configured to temporarily store a variety of data, a previous circulation time, a previous printing time, print data, a flag and the like, which are used in the control program. The head drive unit 14 is electrically connected to the head units 100 and 200 configured to eject inks, and is configured to drive a piezoelectric element provided in each ejection channel of the head units 100 and 200 (refer to FIG. 1), thereby ejecting inks from the first nozzle row W1 (refer to FIG. 3), the second nozzle row W2 (refer to FIG. 3), the third nozzle row (not shown), the fourth nozzle row, and the like.

The main scanning drive unit 15 includes a drive motor 19 (refer to FIG. 1) and is configured to move the carriage 20 in the right and left direction (main scanning direction). The sub-scanning drive unit 16 includes a motor, a gear, and the like (not shown), and is configured to drive the platen drive mechanism 6 (refer to FIG. 1) to move the platen (not shown) in the front and rear direction (sub-scanning direction).

The cap drive unit 18 includes a cap drive motor (not shown), a gear, and the like, and is configured to move the cap support part 69 in the upper and lower direction, thereby moving the cap 67 in the upper and lower direction. Driving the cap drive unit 18 moves the cap support part 69 of the maintenance unit 141 and the cap support part 69 of the maintenance unit 142 in the upper and lower direction at the same time. The pump drive unit 21 is configured to drive the pump 752 and the suction pump 199. The operation panel 5 includes a display 50 and an operation button 52. An input from the operation button 52 is input to the CPU 11.

The human detecting sensor 23 is configured to detect a human, for example. An output from the human detecting sensor 23 is input to the CPU 11, and the CPU 11 is configured to determine whether or not a human is present in front of the printing apparatus 1, based on the input from the human detecting sensor 23. The cartridge sensors 24 are each provided in the mounting frame unit 4, and configured to detect the mounting of the cartridges 311 to 324. The valve drive unit 780 is configured to control the opening/closing valves 766, 763 and 31, which are opening/closing valves. The clock 26 is configured to generate a clock signal for measuring a time. The storage device 27 is a writable non-volatile storage device such as an HDD or a flash memory.

Circulation Processing of Ink

Circulation processing of ink includes ‘ink circulation processing without passing through the head part 110’ and ‘ink circulation processing passing through the head part 110’. First, the ‘ink circulation processing without passing through the head part 110’ is described with reference to FIG. 3. The CPU 11 closes the opening/closing valve 766 and the opening/closing valve 763 and opens the opening/closing valve 31. The CPU 11 then drives the pump 752. The ink flows from the pump 752 in a direction of an arrow 401, and flows through the fourth supply flow path 714A in a direction of an arrow 403.

The flow path 670 of the head part 110 has a narrower flow path than the second bypass flow paths 802A and 802B, has a complicated structure, and makes it difficult for ink to flow. Therefore, a flow path resistance of the flow path 670 is larger than the second bypass flow paths 802A and 802B. Therefore, the ink flows through the second bypass flow path 802A in a direction of an arrow 404 rather than through the flow path 670. Subsequently, the ink passes through the opening/closing valve 31 in a direction of an arrow 405 and flows through the second bypass flow path 802B in a direction of an arrow 406. The ink then flows back through the fifth supply flow path 715A in a direction of an arrow 407, and flows into the first bypass flow path 801. The ink flowing into the first bypass flow path 801 flows from the pump 752 in the direction of the arrow 401 and circulates in a similar manner to that described above. The CPU 11 stops the pump 752 after performing the circulation processing of ink for a first predetermined time, which will be described later. When printing print data, the CPU 11 closes the opening/closing valve 31 and opens the opening/closing valve 766 and the opening/closing valve 763.

Ink Circulation Processing Passing Through Head Part 110

Next, the circulation processing passing through the head part 110 is described. First, the CPU 11 closes the opening/closing valve 31, the opening/closing valve 766, and the opening/closing valve 763. The CPU 11 then drives the pump 752.

The ink flows from the pump 752 in the direction of the arrow 401, and flows through the fourth supply flow path 714A in the direction of the arrow 403. Since the opening/closing valve 31 is closed, the ink flows through the flow path 670 of the head part 110 in the directions of the arrows 411, 412 and 413. The ink then flows back through the fifth supply flow path 715A in the direction of the arrow 407, and flows into the first bypass flow path 801. The ink flowing into the first bypass flow path 801 flows from the pump 752 in the direction of the arrow 401 and circulates in a similar manner to that described above. The CPU 11 stops the pump 752 after performing the ink circulation processing for the first predetermined time.

Details of Control on Circulation Processing of Ink

The details of control on the circulation processing by the CPU 11 of the printing apparatus 1 are described with reference to FIG. 5. In descriptions below, the circulation processing of ink is also simply referred to as ‘circulation’. The circulation was performed previously and a time at which the circulation ended is referred to as ‘previous circulation time’. As an example, when the circulation ends, the CPU 11 acquires a time at that time point from the built-in clock 26. The CPU 11 stores the acquired time in the storage device 27, as the previous circulation time. In addition, the printing was performed previously and a time at which the printing ended is referred to as ‘previous printing time’. When the printing ends, the CPU 11 acquires a time at that time point from the built-in clock 26. The CPU 11 stores the acquired time in the storage device 27, as the previous printing time.

Figure 5:
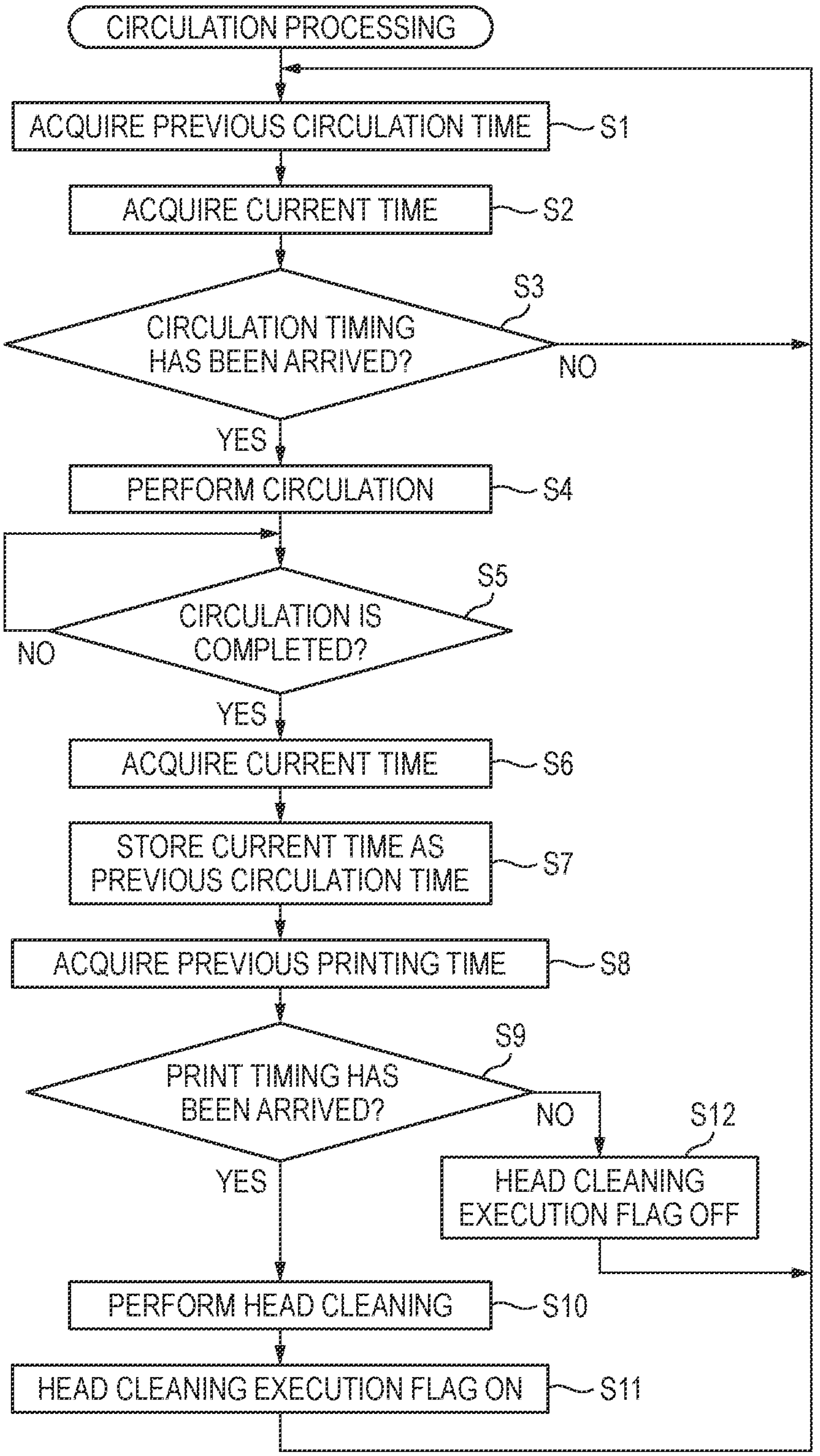
FIG. 5 is a flowchart of circulation processing.
Figure 6:
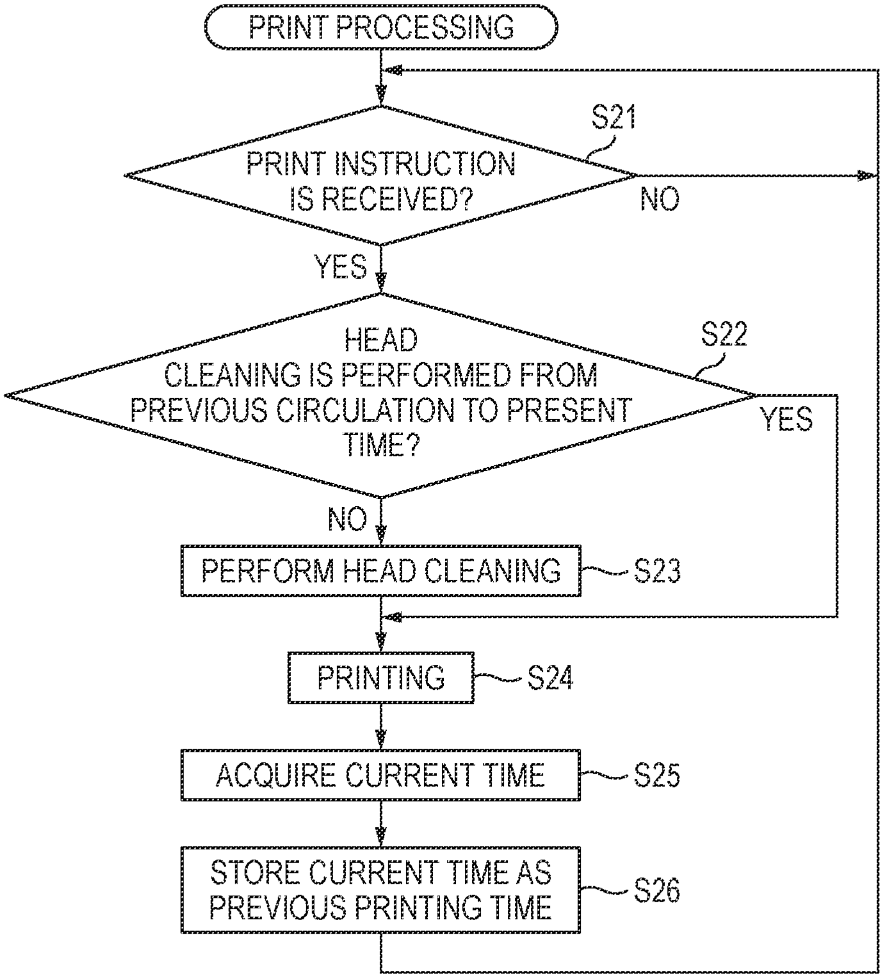
FIG. 6 is a flowchart of print processing.

The CPU 11 operates based on the control program stored in the ROM 12, thereby controlling the printing apparatus 1 to perform circulation processing shown in FIG. 5. First, the CPU 11 acquires the previous circulation time from the RAM 13 (S1). Next, the CPU 11 acquires a current time from the clock 26 (hereinafter referred to as 'current time') (S2). Next, the CPU 11 determines whether or not to arrive at a circulation timing for performing circulation (S3). As an example, the CPU 11 compares the previous circulation time acquired in the processing of S1 and the current time acquired in the processing of S2, and when the current time exceeds a second predetermined time from the previous circulation time, the CPU 11 determines that the circulation timing has been arrived (S3: YES). An example of the second predetermined time is 7 hours. In the case where it is not determined that the circulation timing has been arrived (S3: NO), the CPU 11 returns the processing to S1.

In the case where it is determined that the circulation timing has been arrived (S3: YES), the CPU 11 performs a circulation of the ink. The CPU 11 performs at least one of 'ink circulation processing without passing through the head part 110' and 'ink circulation processing passing through the head part 110'. The CPU 11 may also perform both the processing. After performing the circulation, the CPU 11 determines whether the circulation is completed (S5). In the case where it is not determined that the circulation is completed (S5: NO), the CPU 11 returns the processing to S5. In the case where the circulation of ink is performed for the first predetermined time, for example, 10 minutes, and the circulation is over, the CPU 11 determines that the circulation is completed (S5: YES). Next, the CPU 11 acquires a current time from the clock 26 (S6). The current time acquired in the processing of S6 is a time at which this circulation is completed. Next, the CPU 11 stores the current time acquired in the processing of S6 in the storage device 27, as the previous circulation time (S7).

Next, the CPU 11 acquires the previous printing time from the storage device 27 (S8). The previous printing time is a time at which printing is completed in print processing, which will be described later, and is a time stored in the storage device 27 as the previous printing time.

Next, the CPU 11 determines whether or not to arrive at a print timing (S9). Whether or not to arrive at the print timing is determined based on whether a possibility that printing will be performed from now on is high. As an example, the CPU 11 determines that the print timing has been arrived, in the case where the previous printing time acquired in S8 is within a preset third predetermined time from the previous circulation time stored in S7. That is, in the case where printing has been performed within the third predetermined time from the time at which the circulation (S4) is completed, it is determined that the print timing has been arrived. An example of the third predetermined time is 30 minutes. This is because in the case where the printing has been performed within 30 minutes, a possibility that next printing will be performed is high.

Next, in the case where it is determined that the print timing has been arrived (S9: YES), the CPU 11 performs head cleaning (S10). An example of the head cleaning is purging. In the case where the CPU 11 determines that the print timing has been arrived, a possibility that next printing will be performed is high. Therefore, menisci of the first nozzle row W1 (refer to FIG. 3), the second nozzle row W2 (refer to FIG. 3), the third nozzle row (not shown), and the fourth nozzle row (not shown) are aligned by the head cleaning, so that it is possible to increase a possibility that normal ink ejection from the nozzles will be performed during printing. In the case where the head cleaning is performed, the CPU 11 stores an ON status of a head cleaning execution flag in the storage device 27 (511).

In the case where the CPU 11 does not determine that the print timing has been arrived (S9: NO), the CPU 11 does not perform head cleaning, and the CPU 11 stores an OFF status of the head cleaning execution flag in the storage device 27 (S12) and proceeds to the processing to S1. Since a possibility that next printing will be performed is not high, the head cleaning is not performed. Therefore, the ink consumption resulting from the head cleaning is reduced.

Subsequently, details of the print processing by the CPU 11 of the printing apparatus 1 are described with reference to refer to 6. The CPU 11 operates based on the control program stored in the ROM 12, thereby controlling the printing apparatus 1 to perform print processing. First, the CPU 11 determines whether a print instruction is received (S21). As an example, in the case where an input of a print instruction is received from the operation panel 5, or in the case where an input of a print instruction is received from a terminal device such as a personal computer (not shown) connected to the printing apparatus 1, the CPU 11 determines that the print instruction is received (S21: YES). In the case where it is not determined that the print instruction is received (S21: NO), the CPU 11 returns the processing to S1.

In the case where it is determined that the print instruction is received (S21: YES), the CPU 11 determines whether the head cleaning has been performed from the precious circulation to the present time (S22). As an example, the CPU 11 does not determine that the head cleaning has been performed from the previous circulation to the present time, in the case where the OFF status of the head cleaning execution flag is stored in the storage device 27 (S22: NO). In the case where the CPU 11 does not determine that the head cleaning has been performed from the previous circulation to the present time (S22: NO), the CPU performs the head cleaning (S23). The menisci of the first nozzle row W1 to the fourth nozzle row (not shown) are aligned by the head cleaning, so that a possibility that normal ink ejection from the first nozzle row W1 to the fourth nozzle row (not shown) will be performed during next printing increases.

Next, the CPU 11 performs printing (S24), and acquires a current time at which printing is completed from the clock 26 (S25). Next, The CPU 11 stores the current time acquired in S25 in the storage device 27, as the previous printing time (S26). Note that, in the case where the ON status of the head cleaning execution flag is stored in the storage device 27, the CPU 11 determines that the head cleaning has been performed from the previous circulation to the present time (S22: YES), performs printing (S24) without performing the head cleaning (S23), and performs processing of S25 and S26. After the processing of S26, the CPU 11 returns the processing to S21.

Effects of Embodiment

In the present embodiment, the CPU 11 of the printing apparatus 1 performs the circulation timing determination step (S3) of determining whether or not to arrive at the circulation timing for performing at least of the circulation of ink without passing through the head part or the circulation of the ink passing through the head part. In the case where it is determined that the circulation timing has been arrived (S3: YES), the CPU 11 performs circulation (S4). Next, the CPU 11 performs the print timing determination step (S9), and in the case where it is determined that the print timing has been arrived (S9: YES), the CPU 11 performs cleaning for the head part (S10). In the case where it is not determined that the print timing has been arrived (S9: NO), the CPU 11 does not perform the head cleaning. Therefore, in the case where it is not determined that the print timing has been arrived (S9: NO), the CPU 11 does not perform the head cleaning after the circulation (S4). Therefore, the ink consumption resulting from the head cleaning is reduced. That is, in the case where it is determined in the determination processing of S21 that the print instruction has been received (S21: YES), and in the case where it is determined in the determination processing of S22 that the head cleaning has been performed (S22: YES), the CPU 11 can start printing (S24) without performing the head cleaning (S23). Therefore, printing can be started without waiting for the head cleaning (S23).

The CPU 11 performs the print instruction determination step (S21) of determining whether or not to arrive at the print instruction, and the print step (S24) of performing the head cleaning (S23) and performing printing in the case where it is determined that the print instruction has been received (S21: YES). Therefore, even though the head cleaning is not performed after the circulation, the CPU 11 performs the head cleaning (S23) in the case where it is determined that the print instruction has been received (S21: YES). Therefore, a possibility that normal ink ejection from the head part will be performed during printing increases.

In the print processing, in the case where the head cleaning has not been performed from the previous circulation to the present time (S22: NO), the CPU 11 performs the head cleaning (S23) and performs printing (S24). Therefore, even though the head cleaning has not been performed from the previous circulation of the ink to the present time (S22: NO), the CPU 11 performs the head cleaning (S23) and then performs printing (S24). Therefore, a possibility that normal ink ejection from the head part will be performed during printing increases.

In the print timing determination step (S9), in the case where printing has been performed within the third predetermined time, the CPU 11 determines that the print timing has been arrived (S29: YES) because there is a high possibility that printing will be performed again. Therefore, the CPU 11 can more accurately determine the print timing, based on a time at which printing has been performed.

The present disclosure is not limited to the above embodiment, and can be variously changed. For example, the CPU 11 of the printing apparatus 1 may determine that the print timing has been arrived (S9: YES) in the print timing determination step (S9), in the case where an operation is received on the operation panel 5 within a preset fourth predetermined time. In the case where the operation is received on the operation panel 5 within the fourth predetermined time, there is a high possibility that printing will be performed, so that the CPU 11 determines that the print timing has been arrived. Therefore, the CPU 11 can more accurately determine the print timing, based on a time at which the operation is received on the operation panel 5. Therefore, in the case where the operation is received on the operation panel 5 before the fourth predetermined time, the CPU 11 performs the head cleaning (S10) after the circulation (S4). The CPU 11 performs only the circulation (S4), in the case where the operation is not received on the operation panel 5 before the fourth predetermined time.

In the case where the storage device 27 stores an operation schedule for operating the printing apparatus 1 registered by the operator, the CPU 11 may determine in the print timing determination step (S9) that the print timing has been arrived (S9: YES), in the case where it is determined that it is within a period of the operation schedule. An example of the operation schedule is circulation execution at 7:30 am, printing start at 8:00 am, circulation execution at 12:00 am, printing end at 6:00 pm, and the like. Therefore, in the case of this operation schedule, the CPU 11 determines that 7:30 am to 6:00 pm is within the operation schedule. In this case, the CPU 11 can more accurately determine the print timing, based on the operation schedule. Therefore, the CPU 11 performs the head cleaning (S10) after the circulation (S4), in the case where it is determined that it is within the period of the operation schedule (S10). The CPU 11 performs only the circulation (S4), in the case where it is not determined that it is within the period of the operation schedule.

In the print timing determination step (S9), the CPU 11 may determine that the print timing has been arrived, in the case where received print data has not been processed. The case where the print data has not been processed is, for example, a case where the printing data stored in the RAM 13 is not printed by a number of print instructions instructed from the operation panel 5 or the terminal device connected to the printing apparatus 1. In this case, the CPU 11 may determine that the print timing has been arrived (S9: YES). In the case where the print data has not been processed, there is a high possibility that printing will be performed. Therefore, the CPU 11 can more accurately determine the print timing, based on a processing status of the print data. Therefore, the CPU 11 performs the head cleaning (S10) after the circulation (S4), in the case where it is determined that the received print data has not been processed. In the case where it is determined that the print data has been printed by the number or more of print instructions, the CPU 11 only performs the circulation (S4).

In the print timing determination step (S9), the CPU 11 may determine that the print timing has been arrived, in the case where the human detector configured to detect a human detects a human. For example, in the case where a human detecting signal is input from the human detecting sensor 23, it is determined that the print timing has been arrived (S9: YES). In the case where a human who operates the printing apparatus 1 is present, there is a high possibility that printing will be performed. Therefore, the CPU 11 can more accurately determine the print timing, based on a detection result of the human detecting sensor 23. Note that, in the case where the human detector such as a camera of the terminal device connected to the printing apparatus 1 detects a human, the CPU 11 may receive a human detecting signal from the terminal device and determine that the print timing has been arrived. Therefore, in the case where the human detector detects a human (S9: YES), the CPU 11 performs the head cleaning (S10) after the circulation (S4). The CPU 11 performs only the circulation (S4) in the case where the human detector does not detect a human (S9: NO). Note that, a position where the human detecting sensor 23 is provided is not limited to the front part of the printing apparatus 1, and may be the upper surface of the operation panel 5, the upper surface or the side surface of the housing 2, or the like.

Further, the CPU 11 may store a printing execution history of the printing apparatus 1 in the storage device 27, analyze the printing execution history by using an AI or the like, and estimate an operation pattern of a standard printing of the printing apparatus 1. As an example, the CPU 11 estimates that printing is performed only from 8:00 am to 8:00 pm, printing is not performed on Sunday, and the like. The CPU 11 determines that the print timing has been arrived (S9: YES) when it is within a time zone during which printing is performed. In addition, the CPU 11 does not determine that the print timing has been arrived (S9: NO) when it is outside the time zone during which printing is performed. Therefore, the CPU 11 performs the head cleaning (S10) after the circulation (S4), in the case where it is determined that it is within the time zone during which printing is performed.

The CPU 11 performs only the circulation (S4), in the case where it is determined that it is outside the time zone during which printing is performed.

Further, the CPU 11 may determine that the print timing has been arrived (S9: YES), even in the case where the operation button 52 of the operation panel 5 is operated within the first predetermined time before the previous circulation time stored in the processing of S7 and an operation including a print instruction is performed after the circulation (S4) is over. A time at which the operation including a print instruction is performed is stored in the storage device 27. This is because in the case where the operation button 52 of the operation panel 5 is operated within the first predetermined time before the previous circulation time and the operation including the print instruction is performed, there is a high possibility that printing will be performed again. An example of the first predetermined time is 30 minutes.

Note that, the head cleaning is not limited to purging, and may be wiping of the nozzle surfaces (not shown) of the first nozzle row W1 (refer to FIG. 3) and the second nozzle row W2 (refer to FIG. 3) by the wiper blade 35 (refer to FIG. 2), flushing of ink from the first nozzle row W1 and the second nozzle row W2, or the like. Further, as the ink circulation processing without passing through the head part 110, the CPU 11 may perform the circulation of ink in the sub-pouch 8, the first circulation flow path 721, the first supply flow path 711, and the bypass flow path (not shown). Note that, the example of the second predetermined time in the case where it is determined that the circulation timing has been arrived is not limited to 7 hours. For example, it may be set by the operator, such as 6 hours. In addition, the example of the third predetermined time in the case where it is determined whether or not to arrive at the print timing (S9) is not limited to 30 minutes. A means for changing the third predetermined time may be provided. As an example, the CPU 11 may change the predetermined time from 30 minutes by an input of a time from the operation panel 5. Further, in the determination processing of S9, the CPU 11 may determine that the print timing has been arrived (S9: YES), in the case where it is detected that a maintenance at the start of an operation has been performed within a fifth predetermined time before the execution of the circulation. An example of the fifth predetermined time is 30 minutes. An example of the maintenance at the start of an operation is detachment/attachment of the cartridge for stirring, purging with a large suction force, and the like. This is because there is a high possibility that printing will be performed, after the maintenance at the start of an operation. The detection of the maintenance at the start of an operation may be performed in such a manner that the CPU 11 detects an input of completion of the maintenance at the start of an operation from the operation panel 5. The CPU 11 acquires a time at that time from the clock 26 and stores the same in the storage device 27.

Further, the previous circulation time, the previous printing time, the head cleaning execution flag, and the like may be stored in the RAM 13 in the case where a power supply of the printing apparatus 1 is not turned off. Note that, in the determination of S3 shown in FIG. 5, a circulation time may be set in advance, and the CPU 11 may determine that the circulation timing has been arrived, when the current time acquired in S2 reaches the circulation time. Further, the reservoir of ink is not limited to the cartridge, and may be an ink tank or the like.

Further, the ink circulation processing passing through the head part 110 may be performed inside the head part 110. That is, a circulation flow path having a drive unit such as a pump or an actuator is provided in the head part 110. The CPU 11 may perform an ink circulation processing passing through the circulation flow path inside the head part 110.

What is claimed is:

1. A printing apparatus comprising:
a reservoir configured to store ink;
an inkjet head connected to the reservoir via a flow path; and
a controller configured to perform:
circulation timing determination processing of determining whether or not to arrive at a circulation timing for performing a circulation of the ink via at least one of the flow path or the inkjet head;
a circulation execution processing of executing the circulation in a case where it is determined that the circulation timing comes to be arrived;
print timing determination processing of determining whether or not there is a high possibility that a print instruction is issued after the circulation is executed by the circulation execution step;
a cleaning control processing of:
performing cleaning operation for the inkjet head in a case where it is determined that there is a high possibility that the print instruction is issued; and
not performing the cleaning operation in a case where it is not determined that there is a high possibility that the print instruction is issued;
a print instruction reception determination processing of determining whether the print instruction has been received; and
a print processing of performing the cleaning operation and performing printing in a case where it is determined that the print instruction has been received, and in a case where the cleaning operation has not been performed since the previous circulation.

2. The printing apparatus according to claim 1,
wherein the controller is configured to perform:
print instruction determination processing of determining whether a print instruction is received; and
print processing of performing the cleaning operation and performing printing, in a case where it is determined that the print instruction is issued.

3. The printing apparatus according to claim 2,
wherein the controller is configured to perform the print processing to perform the cleaning operation and preform the printing, in a case where the cleaning operation is not performed from a previous circulation to a present time.

4. The printing apparatus according to claim 1,
wherein the controller performs the print timing determination processing to determine that the print timing comes to be arrived, in a case where printing is performed within a preset predetermined time.

5. The printing apparatus according to claim 1, further comprising:
an operation panel configured to receive an operation of an operator,
wherein the controller performs the print timing determination processing to determine that the print timing comes to be arrived, in a case where an operation is received on the operation panel within a preset predetermined time.

6. The printing apparatus according to claim 1,
wherein the controller performs the print timing determination processing to determine that the print timing comes to be arrived, in a case where it is within a period of an operation schedule during which an operation of the printing apparatus is performed.

7. The printing apparatus according to claim 1,
wherein the controller performs the print timing determination processing to determine that the print timing comes to be arrived, in a case where received print data is not processed.

8. The printing apparatus according to claim 1,
wherein the controller performs the print timing determination processing to determine that the print timing comes to be arrived, in a case where a human detector configured to detect a human detects a human.

9. The printing apparatus according to claim 1,
wherein in a case where the controller performs the circulation timing determination processing, the controller determines whether or not to arrive at a circulation timing for performing at least of a circulation of the ink without passing through the inkjet head or a circulation of the ink passing through the inkjet head.

10. A non-transitory computer-readable storage medium storing a computer program, when executed by a processor of a printing apparatus including a reservoir configured to store ink, an inkjet head connected to the reservoir via a flow path, and the processor, the computer program being configured to cause the printing apparatus to perform:

circulation timing determination processing of determining whether or not to arrive at a circulation timing for performing a circulation of the ink via at least one of the flow path or the inkjet head;

a circulation execution processing of executing the circulation in a case where it is determined that the circulation timing comes to be arrived;

print timing determination processing of determining whether or not there is a high possibility that a print instruction is issued after the circulation is executed by the circulation execution step a cleaning control processing of:

performing cleaning operation for the inkjet head in a case where it is determined that there is a high possibility that the print instruction is issued; and not performing the cleaning operation in a case where it is not determined that there is a high possibility that the print instruction is issued;

a print instruction reception determination processing of determining whether the print instruction has been received; and a print processing of performing the cleaning operation and performing printing in a case where it is determined that the print instruction has been received, and in a case where the cleaning operation has not been performed since the previous circulation.

* * * * *